United States Patent
Amano

(10) Patent No.: US 9,593,616 B2
(45) Date of Patent: Mar. 14, 2017

(54) EXHAUST PIPE FUEL INJECTOR

(71) Applicant: VOLVO TRUCK CORPORATION, Gothenburg (SE)

(72) Inventor: Takafumi Amano, Ageo (JP)

(73) Assignee: Volvo Truck Corporation, Gothenburg (SE)

( * ) Notice: Subject to any disclaimer, the term of this patent is extended or adjusted under 35 U.S.C. 154(b) by 0 days.

(21) Appl. No.: 14/735,044

(22) Filed: Jun. 9, 2015

(65) Prior Publication Data

US 2015/0275735 A1 Oct. 1, 2015

Related U.S. Application Data

(63) Continuation of application No. PCT/JP2013/080779, filed on Nov. 14, 2013.

(30) Foreign Application Priority Data

Dec. 10, 2012 (JP) .................. 2012-269045

(51) Int. Cl.
*F01N 3/00* (2006.01)
*F01N 3/36* (2006.01)
(Continued)

(52) U.S. Cl.
CPC ............. *F01N 3/36* (2013.01); *F01N 3/0253* (2013.01); *F01N 9/002* (2013.01);
(Continued)

(58) Field of Classification Search
USPC .......... 60/286, 289, 292, 295, 297, 301, 303
See application file for complete search history.

(56) References Cited

U.S. PATENT DOCUMENTS 7,337,607 B2 * 3/2008 Hou ...................... F01N 3/0253
60/274
7,481,045 B2 * 1/2009 Fayard .................. F01N 3/0231
60/274

(Continued)

FOREIGN PATENT DOCUMENTS

EP 1970544 A2 9/2008
EP 2169192 A1 3/2010
(Continued)

OTHER PUBLICATIONS

International Preliminary Report on Patentability dated Jun. 25, 2015, which issued in International Application No. PCT/JP2013/080779, together with an English language translation thereof.
(Continued)

*Primary Examiner* — Binh Q Tran
(74) *Attorney, Agent, or Firm* — McDermott Will & Emery LLP

(57) ABSTRACT

An exhaust pipe fuel injector capable of preventing fuel from remaining in a fuel supply system and thus capable of preventing the fuel supply system from being blocked due to carbonization of the fuel, is provided. The exhaust pipe fuel injector includes: a fuel injection nozzle that injects the fuel into an exhaust pipe; a supply pipe through which a mixed fluid of the fuel and air is supplied into the fuel injection nozzle; and a control unit. The control unit has a function of continuing combustion until no fuel remains in the inside of the supply pipe during regeneration of a diesel particulate filter.

4 Claims, 2 Drawing Sheets

(51) Int. Cl.
*F01N 9/00* (2006.01)
*F01N 3/025* (2006.01)

(52) U.S. Cl.
CPC ...... *F01N 2610/03* (2013.01); *F01N 2610/08* (2013.01); *Y02T 10/47* (2013.01)

(56) References Cited

U.S. PATENT DOCUMENTS

| | | | |
|---|---|---|---|
| 7,874,148 B2* | 1/2011 | Duffield | F01N 3/0253 239/106 |
| 7,926,262 B2* | 4/2011 | Cox | F01N 3/0256 60/286 |
| 8,359,833 B2* | 1/2013 | Nalla | F01N 3/103 60/274 |
| 9,140,166 B1* | 9/2015 | Nelson | F01N 3/2066 |
| 2006/0096274 A1 | 5/2006 | Fayard | |
| 2010/0162688 A1 | 7/2010 | Chang et al. | |

FOREIGN PATENT DOCUMENTS

| | | |
|---|---|---|
| EP | 2235336 A1 | 10/2010 |
| JP | 2004-263661 A | 9/2004 |
| JP | 2007-023792 A | 2/2007 |
| JP | 2007-187006 A | 7/2007 |
| JP | 2008-261264 A | 10/2008 |
| JP | 2011-032932 A | 2/2011 |
| JP | 2011-144747 A | 7/2011 |
| JP | 2012-127287 A | 7/2012 |
| JP | 2012-127320 A | 7/2012 |
| WO | WO-2009/026327 A1 | 2/2009 |

OTHER PUBLICATIONS

Japanese Office Action dated Mar. 29, 2016, which issued in Japanese Patent Application No. 2014-551939, together with partial English language translation.

Extended European Search Report dated Sep. 20, 2016, which issued in European Application No. 13862338.4.

Chinese Office Action dated Dec. 20, 2016, which issued in Chinese Application No. 201380064267.0, together with partial English language translation thereof.

* cited by examiner

1

EXHAUST PIPE FUEL INJECTOR

CROSS-REFERENCE TO RELATED APPLICATION

This application is a continuation application of PCT/JP2013/080779, filed on Nov. 14, 2013, which is incorporated by reference in its entirety for all purposes.

BACKGROUND OF THE INVENTION

1. Field of the Invention

The present invention relates to an apparatus for injecting fuel into an exhaust pipe in order to regenerate a diesel particulate filter of a diesel engine.

2. Description of Related Art

As a technique for regenerating a diesel particulate filter of a diesel engine, there has been well-known a technique for removing, by burning, captured particulate matter by oxidation reaction heat of fuel by injecting fuel into an exhaust pipe.

As a technique relating to such a technique, there has been proposed that in an exhaust pipe fuel injector that injects fuel into an exhaust pipe in order to regenerate a diesel particulate filter of a diesel engine, a branch point is provided on an upstream side (on a fuel supply source side) of an injection nozzle belonging to a supply system of fuel to be injected into the exhaust pipe, and a fuel storage mechanism that stores fuel remaining in the fuel supply system is provided on a branch side (see Japanese Patent Application Laid-open Publication No. 2012-127287).

Although such a conventional technique is an effective technique, when the regeneration of the diesel particulate filter is interrupted in a case in which, for example, a control signal instructing stopping of the regeneration (diesel particulate filter regeneration stopping signal) is generated due to some reason during regeneration processing of the diesel particulate filter, fuel may remain in the supply system of fuel to be injected into the exhaust pipe (fuel supply system), so that there is a concern that the fuel supply system is blocked due to carbonization of the remaining fuel.

Furthermore, it is necessary to provide the branch point and the fuel storage mechanism communicating with the branch point, and hence, there have been a problem in that the constitution of the fuel injection system becomes complicated, resulting in pushing up of a manufacturing cost.

Still further, there is a concern that fuel is carbonized in a region in the vicinity of the branch point and the fuel storage mechanism communicating with the branch point, and the fuel supply system is blocked thereby.

SUMMARY OF THE INVENTION

The present invention has been made in view of the above-mentioned problems of the conventional technique, and it is an object of the present invention to provide an exhaust pipe fuel injector capable of preventing fuel from remaining in a fuel supply system for supplying fuel to be injected into an exhaust pipe even when regeneration processing of a diesel particulate filter is interrupted, so that the fuel supply system can be prevented from being blocked due to carbonization of the fuel.

An exhaust pipe fuel injector of the present invention is an exhaust pipe fuel injector that injects fuel into an exhaust pipe in order to regenerate a diesel particulate filter of a diesel engine, the exhaust pipe fuel injector including: a fuel injection nozzle (41) that injects the fuel into the exhaust pipe (21); a supply pipe (Lx) through which a mixed fluid of the fuel and air is supplied into the fuel injection nozzle (41); and a control unit (50). The control unit (50) has a function of continuing combustion until no fuel remains in the inside of the supply pipe (Lx) during regeneration of a diesel particulate filter (23B).

According to the present invention, it is preferable that the control unit (50) have a function of not supplying fuel to the supply pipe (Lx) when a temperature of a region on an upstream side of the diesel particulate filter (23B) (front portion of the diesel particulate filter) is not elevated to a temperature necessary for regenerating the diesel particulate filter.

According to the present invention, it is preferable that the exhaust pipe fuel injector further includes: a fuel supply pipe (Lf) communicating with a fuel supply source; and an air supply pipe (La) through which the air is supplied. Neither a branch point nor a valve is provided in the supply pipe (Lx) in a region between a junction (Px) at which the air supply pipe (La) joins to the supply pipe (Lx), and the fuel injection nozzle (41).

A method of regenerating a diesel particulate filter using the exhaust pipe fuel injector of the present invention, includes: a temperature elevation step (S2) of elevating a temperature in a region on an upstream side of the diesel particulate filter (23B) (front portion of the diesel particulate filter) to a temperature necessary for regenerating the diesel particulate filter; and a diesel particulate filter regeneration step (S5) of injecting fuel into the exhaust pipe (21). In the diesel particulate filter regeneration step (S5), the combustion is continued until no fuel remains in the inside of the fuel supply pipes (Lx, Lf).

In the method of regenerating a diesel particulate filter using the exhaust pipe fuel injector (100) of the present invention, it is preferable that when the temperature in the region on the upstream side of the diesel particulate filter (23B) (front portion of the diesel particulate filter) is not elevated to the temperature necessary for regenerating the diesel particulate filter, the diesel particulate filter regeneration step be not executed, and the control of continuing the combustion until no fuel remains in the supply pipe (Lx) be not executed either.

According to the present invention having the above-mentioned constitution, the control unit (50) has the function of continuing the combustion until no fuel remains in the supply pipe (Lx) during the regeneration of the diesel particulate filter (23B), and hence, even when a control signal instructing the interruption of the regeneration of the diesel particulate filter is generated, the regeneration processing of the diesel particulate filter (23B) is continued until all fuel in the supply pipe (Lx) is burned.

Accordingly, it is possible to prevent the fuel from remaining in the supply pipe (Lx), and hence, there is no possibility that the supply pipe is blocked due to carbonization of remaining fuel.

Furthermore, according to the present invention, unlike the above-mentioned conventional technique (Patent Document 1), it is unnecessary to provide the fuel storage mechanism for storing remaining fuel, and hence, it is possible to prevent the fuel remaining in the mechanism from being carbonized and the pipe system (Lx, Lf) from being blocked thereby.

In the present invention, when the temperature of the region on the upstream side of the diesel particulate filter (23B) (on the front portion of the diesel particulate filter) is not elevated to the temperature necessary for regenerating the diesel particulate filter, fuel is not supplied to the fuel supply pipes (Lx, Lf). Due to such a constitution, under a condition in which the temperature is low so that the diesel particulate filter (23B) cannot be regenerated, fuel is not supplied to the fuel supply pipes (Lx, Lf), and hence, it is possible to prevent the fuel, which is not burned, from being carbonized in the pipes (Lx, Lf) and the pipes from being blocked thereby.

Furthermore, in the present invention, the exhaust pipe fuel injector is configured so that the fuel supply pipe (Lf) communicating with the fuel supply source (46) and the air supply pipe (La) through which air is supplied, are provided, but neither the branch point nor the valve is provided in the supply pipe (Lx) in the region between the junction (Px) at which the air supply pipe (La) joins to the supply pipe (Lx), and the fuel injection nozzle (41). Due to such a constitution, there is no possibility that fuel remains in a region that communicates with the branch point or in a region in the vicinity of the valve, and hence, the carbonization of fuel remaining in such a region can be prevented.

DESCRIPTION OF PREFERRED EMBODIMENTS

Hereinafter, an embodiment of the present invention will be described with reference to the accompanying drawings.

Figure 1:
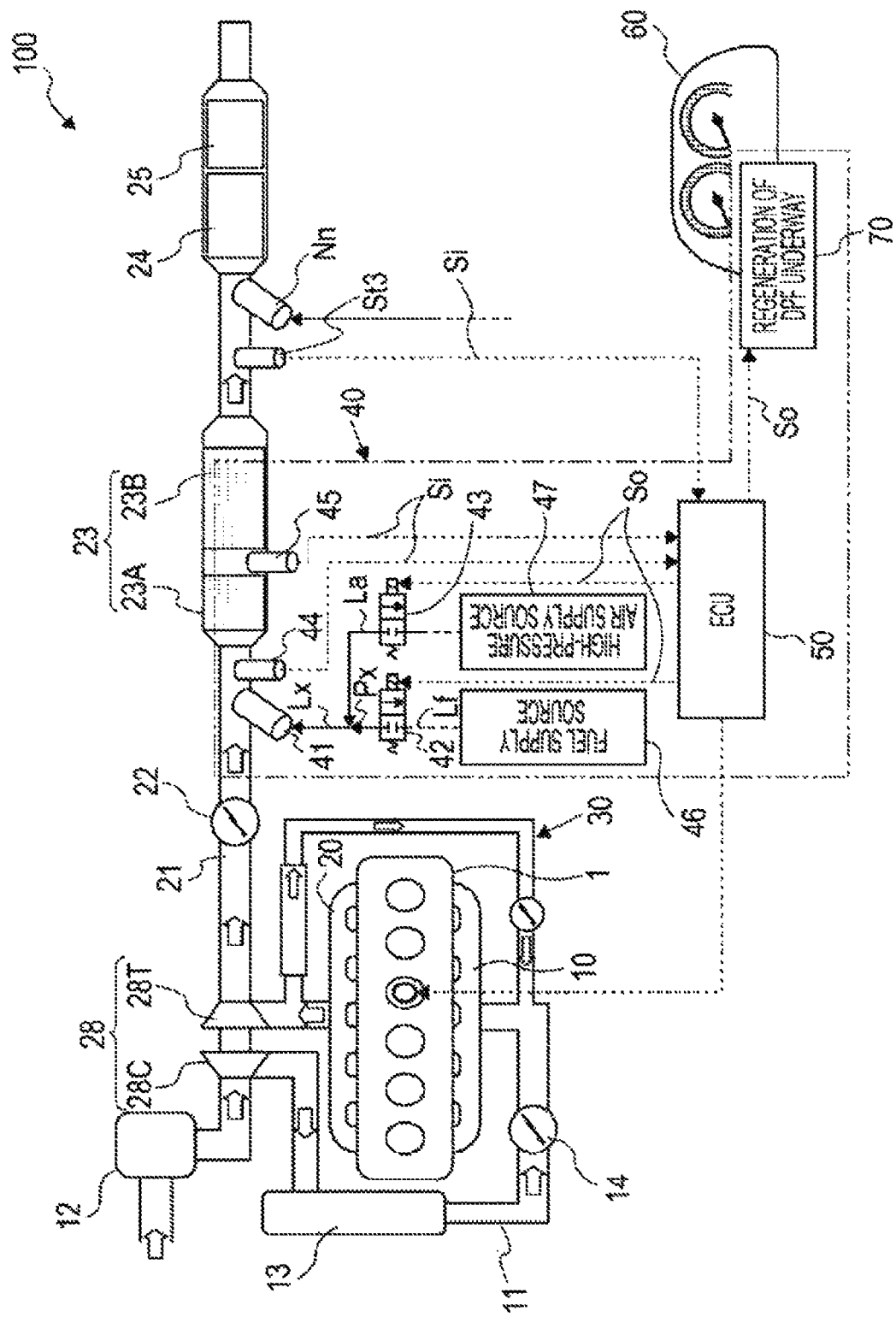
FIG. 1 is a block diagram illustrating an embodiment of the present invention.

FIG. 1 illustrates a constitution of an intake system and an exhaust system of a diesel engine including an exhaust pipe fuel injector according to an embodiment of the present invention.

In FIG. 1, a diesel engine 1 includes an intake manifold 10 and an exhaust manifold 20. An intake pipe 11 is connected to the intake manifold 10. The intake pipe 11 is provided with an air cleaner 12, a compressor 28C of a turbocharger 28, an inter cooler 13 for cooling intake air, and an intake shutter 14 for temporarily throttling an amount of intake air at a cold condition or at the time of starting the diesel engine 1 in this order from an upstream side (air intake port side).

An exhaust pipe 21 is connected to the exhaust manifold 20. The exhaust pipe 21 is provided with an exhaust turbine 28T of the turbocharger 28, an exhaust shutter 22, a continuous regeneration type diesel particulate filter device (hereinafter referred to as "DPF device") 23, an SCR converter 24 and an ammonia oxidation catalytic converter 25 in this order toward a downstream side from the exhaust manifold 20.

The DPF device 23 includes an oxidation catalytic converter 23A and a diesel particulate filter 23B. The oxidation catalytic converter 23A has a function of oxidizing CH (hydrocarbons) and COx (carbon oxides), and the diesel particulate filter 23B has a function of collecting and removing PM (particulate matter) in exhaust gas.

The SCR converter 24 has a function of reducing and purifying NOx (nitrogen oxides) using ammonia (reducing agent) generated from a urea aqueous solution.

Symbol 30 indicates an EGR system for recirculating a part of exhaust gas to intake air.

In FIG. 1, a region indicated by symbol 40 is an exhaust pipe fuel injector.

The exhaust pipe fuel injector 40 includes: an in-exhaust pipe fuel injection nozzle (hereinafter referred to as "fuel injection nozzle") 41; a fuel (light oil, for example) supply valve 42; a high-pressure air supply valve 43; a first exhaust gas temperature sensor 44; a second exhaust gas temperature sensor 45; a control unit 50 serving as a control means; and a monitor 70 arranged in the inside of a meter panel 60.

A nozzle injection hole of the in-exhaust pipe fuel injection nozzle 41 is arranged in the exhaust pipe 21 in a region between the turbocharger 28 and the DPF device 23. The in-exhaust pipe fuel injection nozzle 41 is communicably connected to the fuel supply valve 42 through a supply pipe Lx, and the fuel supply valve 42 is communicably connected to a fuel supply source 46 through a fuel supply line Lf. In other words, the supply pipe Lx is a pipe extending between the in-exhaust pipe fuel injection nozzle 41 and the fuel supply valve 42, and the fuel supply line Lf is a pipe extending between the fuel supply valve 42 and the fuel supply source 46.

In the supply line Lx (region between the in-exhaust pipe fuel injection nozzle 41 and the fuel supply valve 42), a junction Px at which a high-pressure air line La joins to the supply line Lx, is provided.

In the high-pressure air line La, a high-pressure air supply valve 43 is disposed, and the high-pressure air line La communicates with a high-pressure air supply source 47.

In the exhaust pipe 21, the first temperature sensor 44 for measuring a temperature of exhaust gas flowing through the exhaust pipe 21 is disposed in a region between the in-exhaust pipe fuel injection nozzle 41 and the DPF device 23.

In the DPF device 23, the second temperature sensor 45 for measuring a temperature of exhaust gas is disposed in a region between the oxidation catalytic converter 23A and the diesel particulate filter 23B.

The first temperature sensor 44 and the second temperature sensor 45 are connected to the control unit 50 by input signal lines Si. Each of the temperature sensors 44, 45 has a function of outputting a detection signal indicating a detection result to the control unit 50.

The fuel supply valve 42 and the high-pressure air supply valve 43 are connected to the control unit 50 by control signal lines So. The control unit 50 has a function of outputting a valve opening and closing control signal to the fuel supply valve 42 and the high-pressure air supply valve 43.

The control unit 50 is also connected to the monitor 70 by a control signal line So, and has a function of outputting an information signal relating to an operation of the exhaust pipe fuel injector 40.

In the embodiment illustrated in the figure, a third temperature sensor St3, and an injection nozzle Nn for injecting a urea aqueous solution into the inside of the exhaust pipe 21 are disposed in the exhaust pipe 21 in a region between the DPF device 23 and the SCR converter 24 in this order from an upstream side to a downstream side.

The third temperature sensor St3 is connected to the control unit 50 by an input signal line Si, and a detection signal of the third temperature sensor St3 is transmitted to the control unit 50.

Next, a control of the fuel injection into the exhaust pipe will be described based on a flowchart of FIG. 2 with reference to FIG. 1.

Figure 2:
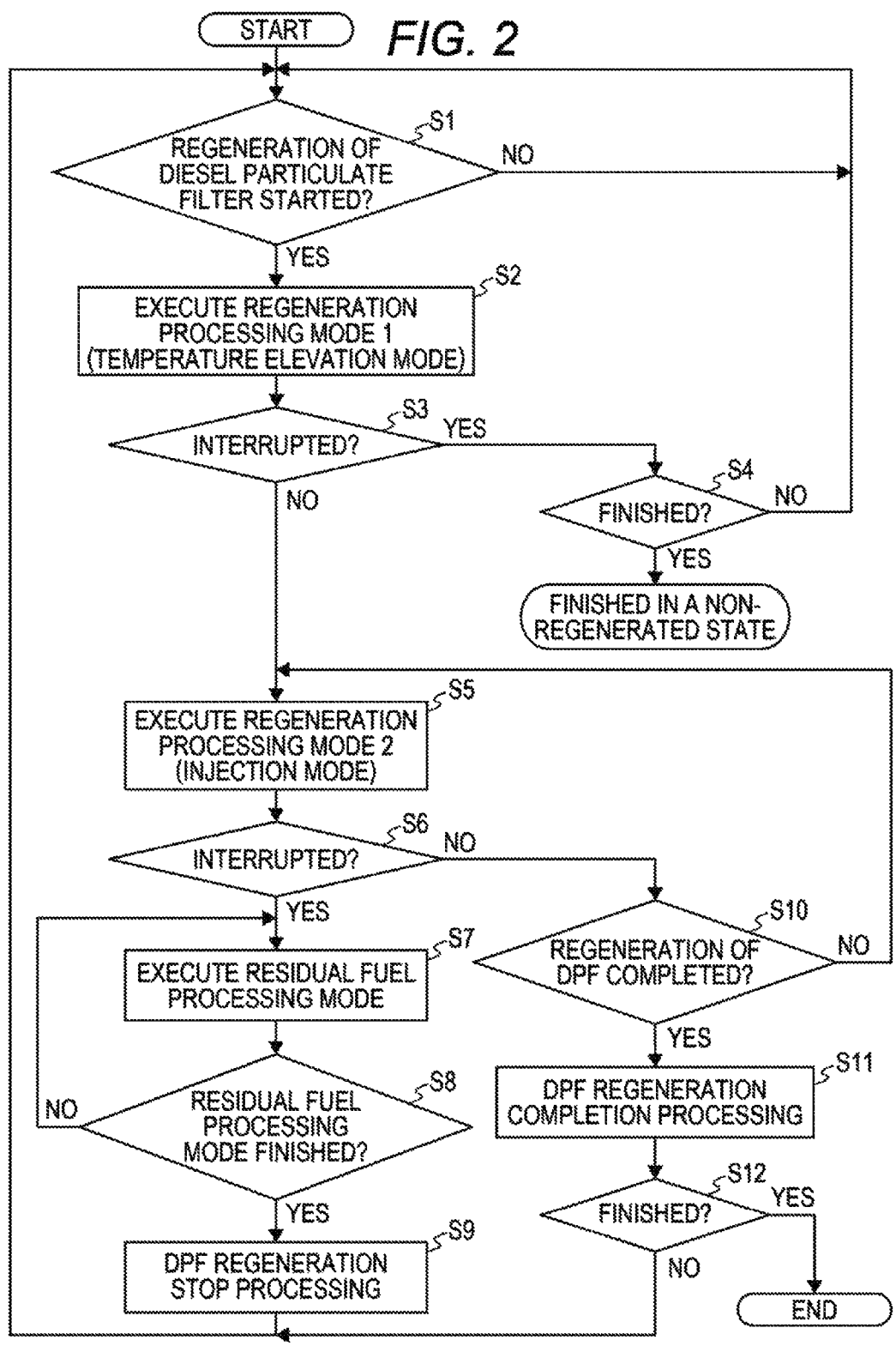
FIG. 2 is a flowchart illustrating a control performed in the embodiment illustrated in FIG. 1.

In step S1 in FIG. 2, it is determined whether or not the DPF device 23 has started the regeneration.

When the DPF device 23 has started the regeneration (YES in step S1), processing proceeds to step S2, whereas when the DPF device 23 does not yet start the regeneration (NO in step S1), processing returns to step S1, and the loop in which the determination in step S1 is "NO" is repeated.

In step S2, a regeneration mode 1 (temperature elevation mode) is executed. In the regeneration mode 1 (temperature elevation mode), a temperature of the exhaust gas is elevated to a temperature sufficient for regenerating the diesel particulate filter 23B.

The regeneration mode 1 (temperature elevation mode) is executed until a temperature of the exhaust gas measured by the first temperature sensor 44 is elevated to a predetermined threshold value (threshold value for the first temperature sensor 44), and a temperature of the exhaust gas measured by the second temperature sensor 45 is elevated to a predetermined threshold value (threshold value for the second temperature sensor 45).

Here, the "predetermined threshold value" of the temperature of the exhaust gas is a temperature at which a reaction of HC (hydrocarbons) in fuel takes place in the oxidation catalytic converter 23A. That is, the "regeneration mode 1 (temperature elevation mode)" is a regeneration mode (temperature elevation mode) in a stage before the temperature of the exhaust gas is elevated to the temperature at which a reaction of HC in fuel takes place in the oxidation catalytic converter 23A.

During a period until the temperature of the exhaust gas is elevated to the threshold value for the first temperature sensor 44, and is elevated to the threshold value for the second temperature sensor 45 (during a period in which the regeneration mode 1 (temperature elevation mode) is executed), it is determined in step S3 whether or not the regeneration mode 1 (temperature elevation mode) has been interrupted due to the stopping of regeneration processing conducted by a driver, for example.

When the regeneration mode 1 has been interrupted (YES in step S3), processing proceeds to step S4. On the other hand, when the regeneration mode 1 is not interrupted (NO in step S3), processing proceeds to step S5.

When it is determined in step S3 that the regeneration mode 1 has been interrupted, the monitor 70 displays a message indicating that "regeneration has been interrupted".

In step S4, it is determined whether or not the control of the fuel injection into the exhaust pipe is to be finished. When the control is to be finished (YES in step S4), the control is finished although the regeneration of the diesel particulate filter 23B is not yet completed.

In this case, the temperature of the exhaust gas is not elevated to the temperature necessary for regenerating the diesel particulate filter 23B, the fuel supply valve 42 is not opened, and hence, fuel is not injected into the exhaust pipe 21 by the fuel injection nozzle 41. Therefore, even when fuel remains in the inside of the fuel supply line Lf in the exhaust pipe fuel injector 40, there is no possibility that fuel is carbonized and the pipe is blocked thereby.

On the other hand, when the control of the fuel injection into the exhaust pipe is continued (NO in step S4), processing returns to step S1, and processing in step S1 and steps succeeding to step S1 are repeated.

In step S5, a regeneration mode 2 (injection mode) is executed. That is, fuel is injected into the inside of the exhaust pipe 21 by the fuel injection nozzle 41, and the diesel particulate filter 23B is regenerated by the exhaust gas of which temperature has been elevated.

Here, the "regeneration mode 2 (injection mode)" is a regeneration mode (injection mode) in a stage in which the temperature of the exhaust gas has been elevated to the temperature at which the reaction of HC in fuel takes place in the oxidation catalytic converter 23A.

In next step S6, the control unit 50 determines whether or not the regeneration mode 2 (injection mode) has been interrupted by the stopping of regeneration processing, the stopping of the engine, or the like, conducted by a driver.

When the regeneration mode 2 (injection mode) has been interrupted (YES in step S6), processing proceeds to step S7.

On the other hand, when the regeneration mode 2 (injection mode) is not interrupted (NO in step S6), processing proceeds to step S10.

In step S7 (when the regeneration mode 2 (injection mode) has been interrupted), a message indicating that "although the regeneration mode has been interrupted, residual fuel processing mode is to be executed" is displayed on a screen of the monitor 70. Then, the residual fuel processing mode is executed.

In the "regeneration mode 2 (injection mode)", when the regeneration is interrupted, there is a concern that fuel in the supply pipe Lx is held, so that the fuel in the supply pipe Lx is carbonized.

However, in the residual fuel processing mode, although the fuel supply valve 42 is closed, an operation for injecting high-pressure air and fuel remaining in the supply pipe Lx into the exhaust pipe 2 by the fuel injection nozzle 41, is executed. That is, the high-pressure air and the fuel are injected into the inside of the exhaust pipe 2 until no fuel remains in the supply pipe Lx, and hence, the regeneration of the diesel particulate filter 23B is continued. Due to this operation, no fuel remains in the supply pipe Lx of the exhaust pipe fuel injector 40. Accordingly, it is possible to prevent the fuel in the supply pipe Lx from being carbonized and the supply pipe Lx from being blocked thereby.

In step S8, the control unit 50 determines whether or not the residual fuel processing mode has been finished.

Whether or not the residual fuel processing mode has been finished can be determined based on whether or not the exhaust gas temperatures measured by the first and second temperature sensors 44, 45 become lower than the threshold values for the respective temperature sensors, for example. Alternatively, whether or not the residual fuel processing mode has been finished can be determined by determining whether or not a predetermined time (time sufficient for bringing about a state in which no fuel remains in the supply pipe Lx) elapses from the start of the residual fuel processing mode using a timer (not illustrated).

When the residual fuel processing mode has been finished (YES in step S8), processing for stopping the regeneration of the DPF device 23 is executed (step S9), processing returns to step S1, and processing in step S1 and steps succeeding to step S1 are repeated.

On the other hand, when the residual fuel processing mode is not yet finished (NO in step S8), processing returns to step S7, and the loop in which the determination in step S7 is "NO" is repeated.

When it is determined that the regeneration mode 2 (injection mode) is not interrupted in step S6, it is determined in step S10 whether or not the regeneration of the DPF device 23 has been completed. When the regeneration of the DPF device 23 has been completed (YES in step S10), processing proceeds to step S11, and regeneration completion processing of the DPF device 23 is executed. The regeneration completion processing of the DPF device 23 is executed after a lapse of a predetermined time from the start of the regeneration mode 2 (injection mode), for example, and the injection of the mixed fluid of the fuel and the high-pressure air by the fuel injection nozzle 41 is stopped.

When the regeneration of the DPF device 23 is not yet completed (NO in step S10), processing returns to step S5, and the regeneration processing of the DPF device 23 is continued.

After the regeneration completion processing of the DPF device 23 in step S11, processing proceeds to step S12, and it is determined whether or not a driver stops the engine (finishes the regeneration completion processing), for example.

When the driver finishes the regeneration completion processing (YES in step S12), the engine is stopped.

On the other hand, when the driver does not stop the engine (NO in step S12), processing returns to step S1, and the above-mentioned processing in step S1 and succeeding to step S1 are repeated.

According to the embodiment illustrated in the figures, the control unit 50 has the function of continuing the combustion until no fuel remains in the supply pipe Lx of the exhaust pipe fuel injector 40 during the regeneration of the diesel particulate filter 23B. Accordingly, even when a control signal instructing the interruption of the regeneration of the diesel particulate filter 23B is generated, the regeneration processing of the diesel particulate filter 23B is continued until all fuel in the supply pipe Lx is burned.

Accordingly, it is possible to prevent fuel from remaining in the supply pipe Lx, and hence, there is no possibility that the pipe system in the exhaust pipe fuel injector 40 is blocked due to carbonization of remaining fuel.

Furthermore, according to the embodiment illustrated in the figures, unlike the above-mentioned conventional technique (Patent Document 1), it is unnecessary to provide the fuel storage mechanism for storing remaining fuel, and hence, it is possible to prevent the fuel remaining in such a mechanism from being carbonized and the pipe system from being blocked thereby.

It should be noted that the illustrated embodiment is merely an example, and the technical scope of the present invention is not limited by the description of the embodiment.

It should be noted that the entire contents of Japanese Patent Application No. 2012-269045, filed on Dec. 10, 2012, on which convention priority is claimed, is incorporated herein by reference.

It should be also be understood that many modifications and variations of the described embodiments of the invention will be apparent to a person having an ordinary skill in the art without departing from the spirit and scope of the present invention as claimed in the appended claims.

What is claimed is:

1. An exhaust pipe fuel injector for injecting fuel into an exhaust pipe in order to regenerate a diesel particulate filter of a diesel engine, the exhaust pipe fuel injector comprising:
   a fuel injection nozzle configured to inject the fuel into the exhaust pipe;
   a supply pipe configured to allow the fuel or air to be supplied through the supply pipe into the fuel injection nozzle; and
   a control unit,
   wherein the control unit has a function for continuing combustion until no fuel remains inside of the supply pipe during regeneration of the diesel particulate filter,
   wherein, when the diesel particulate filter is regenerated, the supply pipe is configured to supply the fuel to the fuel injection nozzle, and
   wherein, when the generation of the diesel particulate filter is interrupted, the supply pipe is configured to continue to supply the air to the fuel injection nozzle until an exhaust gas temperature becomes lower than a threshold value.

2. The exhaust pipe fuel injector according to claim 1, wherein the control unit has a function for not supplying the fuel to the supply pipe when a temperature of a region on an upstream side of the diesel particulate filter is not elevated to a temperature necessary for regenerating the diesel particulate filter.

3. The exhaust pipe fuel injector according to claim 1, further comprising:
   a fuel supply pipe configured to communicate with a fuel supply source; and
   an air supply pipe configured to supply the air through the air supply pipe,
   wherein neither a branch point nor a valve is provided in the supply pipe in a region between a junction at which the air supply pipe joins to the supply pipe, and the fuel injection nozzle.

4. The exhaust pipe fuel injector according to claim 2, further comprising:
   a fuel supply pipe configured to communicate with a fuel supply source; and
   an air supply pipe configured to supply the air through the air supply pipe,
   wherein neither a branch point nor a valve is provided in the supply pipe in a region between a junction at which the air supply pipe joins to the supply pipe, and the fuel injection nozzle.

* * * * *